United States Patent [19]
Willen

[11] 3,822,620
[45] July 9, 1974

[54] TOOL HOLDER ASSEMBLY HAVING MEANS FOR SELECTIVELY ADJUSTING THE POSITION OF THE WORK TOOL

[75] Inventor: Charles Willen, Villeneuve, Switzerland

[73] Assignee: Charles Willen & Cie, Villeneuve, Switzerland

[22] Filed: Oct. 5, 1973

[21] Appl. No.: 404,128

Related U.S. Application Data

[60] Division of Ser. No. 386,297, Aug. 7, 1973, which is a continuation of Ser. No. 67,370, Aug. 17, 1970.

[30] Foreign Application Priority Data
Aug. 29, 1969 Switzerland.................. 13108/69
Aug. 29, 1969 Switzerland.................. 13109/69
Aug. 29, 1969 Switzerland.................. 13110/69
Aug. 29, 1969 Switzerland.................. 13112/69

[52] U.S. Cl..................................... 82/36 R, 29/57
[51] Int. Cl......................................... B23b 29/10
[58] Field of Search............. 82/36 R, 36 A, 35, 24; 29/57

[56] References Cited
UNITED STATES PATENTS
| | | | |
|---|---|---|---|
| 1,732,706 | 10/1929 | Wiles | 29/57 |
| 3,402,625 | 9/1968 | Sweeny | 82/36 |
| 3,404,590 | 10/1968 | Sweeny | 82/36 |
| 3,690,783 | 9/1972 | Heaton et al. | 408/146 |

Primary Examiner—Leonidas Vlachos
Attorney, Agent, or Firm—Emmanuel J. Lobato; Robert E. Burns; Bruce L. Adams

[57] ABSTRACT

A tool holder assembly comprises a tool support having a tool-holding recess for releaseably holding a work tool and a mounting shank slideably disposed within a bore provided in a machine tool so that the work tool position may be adjusted by adjustably sliding the mounting shank relative to the machine tool. An adjustment device connected between the tool support and the machine tool enables very accurate adjustment of the work tool position. The adjustment device comprises an externally threaded tubular shaft connected to the machine tool and slideably receiving therethrough the mounting shank, and an internally threaded hollow sleeve rotatably connected to the tool support and threaded onto the tubular shaft. The hollow sleeve is rotatably connected to a support flange affixed to the tool support by means of a set of anti-friction rollable members housed in bearing races formed directly in the support flange and the hollow sleeve. A series of blind holes are provided around the outer surface of the hollow sleeve and a tool inserted into the blind holes enables manual rotation of the hollow sleeve to effect axial displacement of the tool support and thus the work tool relative to the machine tool.

9 Claims, 3 Drawing Figures

PATENTED JUL 9 1974 3,822,620

TOOL HOLDER ASSEMBLY HAVING MEANS FOR SELECTIVELY ADJUSTING THE POSITION OF THE WORK TOOL

The present application is a division of application Ser. No. 386,297 filed on Aug. 7, 1973 which in turn is a continuation of application Ser. No. 67,370 filed on Aug. 17, 1970.

The present invention relates generally to tool holder assemblies for machine tools, and more particularly, pertains to a tool holder assembly having an axial adjustment device for adjusting the axial position of a work tool along an axis parallel to the rotary axis of the machine tool.

Tool holder assemblies are known which include tool supports for supporting a work tool and which have means for precisely adjusting the axial position of the work tool. The means normally employed for adjusting the work tool are often very bulky and occupy much of the space around the work tool and consequently, it is not possible to gain easy access to the work tool itself. Moreover, the means for axially adjusting the work tool position which are customarily employed in the art do not assure exact adjustment of the work tool position and are composed of numerous interacting components which are costly to both manufacture and maintain.

It is therefore a primary object of the present invention to provide a tool holder assembly having means for accurately adjusting the axial position of the work tool and which is easy to manufacture and compact in size.

It is another object of the present invention to provide a tool holder assembly having means for axially adjusting the position of the work tool and which is composed of a minimum number of parts to thereby reduce the cost of manufacture.

These and other objects of the invention are carried out by providing a tool holder assembly composed of a tool support having means for releaseably holding a work tool and having a mounting shank which is slideably mounted in a bore provided in the machine tool. An axial adjustment device coacts with the tool support for acially adjusting the position of the tool support thereby effecting a corresponding axial adjustment of the work tool. The adjustment device comprises a tubular shaft slideably receiving therethrough the mounting shank and having an externally threaded portion, and a hollow sleeve having an internally threaded portion which is screwed onto the tubular shaft. The shaft is fastened to the machine tool whereas the hollow sleeve is fastened to the tool support by means of a ball bearing assembly so that rotation of the sleeve about the tubular shaft effects axial displacement of the tool support.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various views, and wherein.

Figure 1:
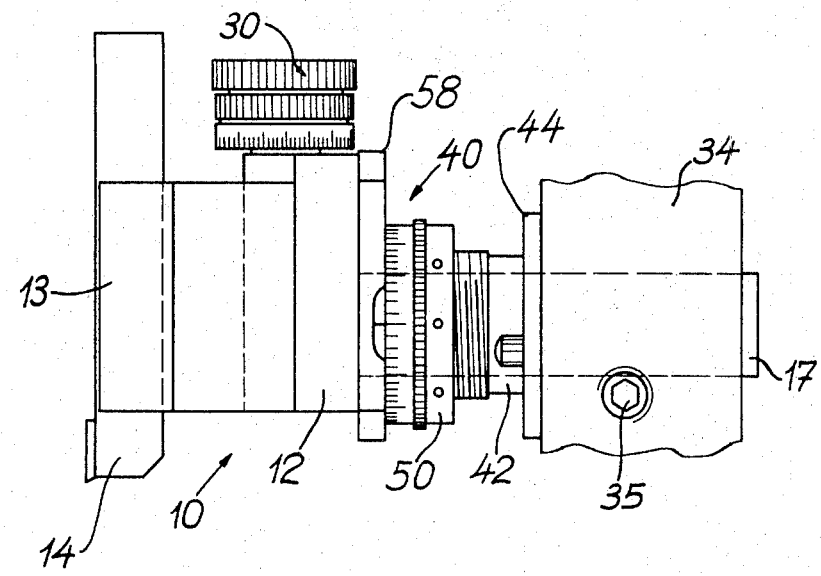
FIG. 1 is a perspective side view of a composite tool holder assembly constructed in accordance with the principles of the invention.

The tool holder assembly is shown in FIG. 1 and comprises a tool support 10 composed of a support member 12 and a slide member 13 slideably mounted along a slideway in the support member. The slide member 13 is provided with a tool-holding recess and a work tool 14 is releaseably locked in the recess by a set of locking screws (not shown). A radial adjustment device 30 coacts with the support member 12 and the slide member 13 to effect radial movement of the work tool 14 towards and away from the rotary axis of the machine tool and this is accomplished by a novel mechanism which effects linear sliding of the slide member 13 in response to manual rotation of an adjustment knob provided for this purpose on the radial adjustment device. A mounting shank 17 extends outwardly from one side of the tool support 10 and is used to mount the tool holder assembly upon the machine tool. The details of the tool support 10 including the radial adjustment device 30 are disclosed in related application Ser. No. 404,127 entitled TOOL HOLDER ASSEMBLY HAVING MEANS FOR SELECTIVELY ADJUSTING THE POSITION OF THE WORK TOOL and filed concurrently herewith and the complete disclosure of the related application is incorporated herein by reference.

The tool holder assembly shown in FIG. 1 is attached to a support body 34 which is attached to the turret (not shown) of a machine tool such as an automatic, semi-automatic, turret or capsten lathe. The mounting shank 17 is slideably received within a bore in the support body 34 and a set of moveable locking rods 35 are threaded into the support body 34 and function to releaseably lock the mounting shank 17 in a selected position.

In accordance with the invention, an axial adjustment device 40 coacts with the tool suport 10 as well as with the support body 34 to effect axial or longitudinal adjustment of the work tool 14 in a direction parallel to the rotary axis of the machine tool.

Figure 2:
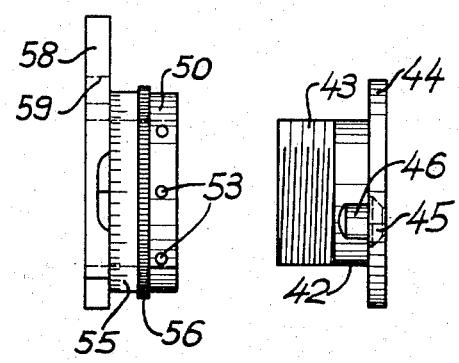
FIG. 2 is an exploded side view of an axial adjustment device.
Figure 3:
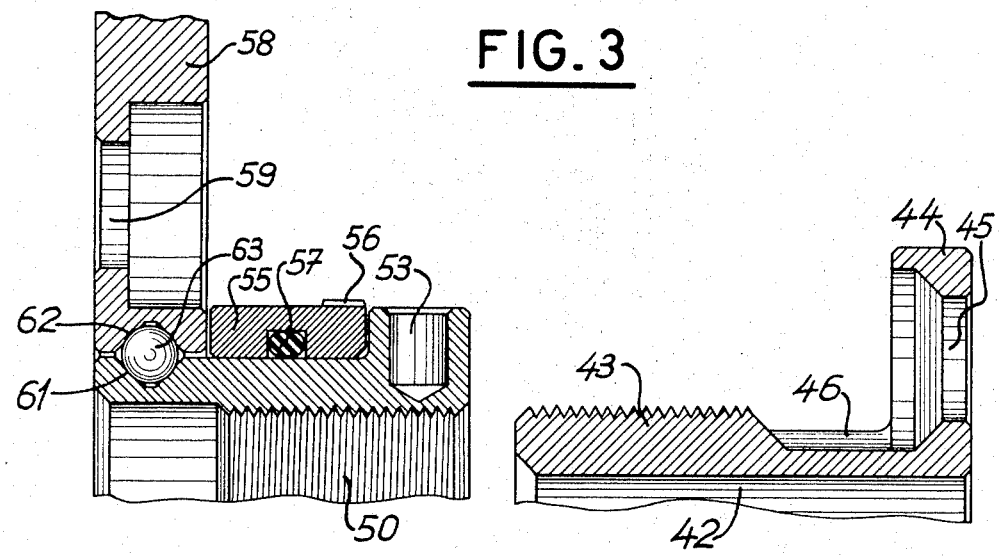
FIG. 3 is a longitudinal cross-section of a part of the axial adjustment device shown in FIG. 2.

The axial adjustment device 40 is shown in more detail in FIGS. 2 and 3 and such comprises a first tubular member comprised of a tubular shaft 42 having an externally threaded portion at one end and a support flange 44 at the other end. The tubular shaft 42 is provided with a longitudinal throughbore which is dimensioned to slideably receive therethrough the mounting shank 17 of the tool support 10.

Fastening means is provided for fastening the tubular shaft 42 onto the support body 34. The fastening means comprises a set of countersunk holes 45 disposed circumferentially about the support flange 44 and a corresponding set of threaded openings in the support body 34. During attachment of the tubular shaft 42 to the support body 34, the shaft 42 is angularly orientated until the countersunk holes 45 align with the threaded openings and then threaded bolts are inserted through the holes 45 and threaded into the corresponding openings in the support body 34. To facilitate the insertion of the bolts, the tubular shaft 42 is provided with recesses 46 to enable easy insertion of the bolts through the holes 45 as well as the tightening of the bolts into the support body 34.

Coacting with the tubular shaft 42 is a second tubular member comprised of a hollow sleeve 50 which has an internally threaded portion screwable onto the threaded portion 43 of the shaft 42. The hollow sleeve 50 is provided with a series of blind holes 53 disposed circumferentially therearound and a tool (not shown) is inserted into the blind holes in order to screw the hollow sleeve 50 onto the tubular shaft 42. The complementary threaded portions of the sleeve 50 and the shaft 42 constitute a threaded coupling for effecting axial displacement of the sleeve 50 relative to the shaft 42 in response to rotation of the sleeve.

A graduated ring 55 having a knurled portion 56 is mounted around the sleeve 50 and the graduated ring carries graduated indicia to provide a visible means of determining the extent of axial adjustment. An O-ring 57 is housed within an annular groove formed in the graduated ring 55 and is wedged between the ring 55 and the external surface of the sleeve 50 to maintain these members in frictional engagement but permitting relative rotation between these members. The frictional engagement is such that whenever the sleeve 50 is rotated, the graduated ring 55 will move therewith but the ring 55 may be manually rotated about the sleeve 50, as explained hereinafter, to facilitate the setting of the axial adjustment.

Another support flange 58 is disposed about the sleeve 50 for supporting the axial adjustment device upon the tool support 10. The support flange 58 is provided with a series of countersunk holes 59 and a corresponding set of threaded bores are provided in the support member 12. Threaded bolts (not shown) are inserted through the holes 59 and threaded into the support member 12 to thereby releaseably fasten the axial adjustment device to the tool support 10.

Mounting means are provided for mounting the sleeve 50 for rotation relative to both the tubular shaft 42 and the tool support 10 and mounting the sleeve 50 for axial movement integrally with the tool support. The mounting means comprises a ball bearing assembly composed of an inner race 61 formed in the outer periphery of the sleeve 50, an outer race 62 formed in the inner periphery of the support flange 58, and a set of rollable members 62 rollably disposed between the two races. The inner and outer races comprise annular grooves having truncated V configuration and the rollable members constitute spherical balls which make point contact with each race at two points. Thus each ball makes four-point contact with the races and the races coact to exert stress on the balls at their four points of contact.

An important feature of the invention resides in utilizing surface portions of the sleeve 50 and the support flange 58 as the bearing races and this enables a much more compact and sturdy structure to be formed than would otherwise be possible if separate bearing races were used. Moreover, the coaction between the bearing races and the spherical balls effectively permits the axial displacement and adjustment of the work tool 14 in response to angular displacement of the sleeve 50 about the tubular shaft 42 without causing any angular movement of the work tool. This is because the ball bearing assembly eliminates friction and effects smooth axial displacement of the work tool unaccompanied by any turning motion of the work tool about the axis of rotation of the sleeve 50 and such is accomplished without the necessity of special guide surfaces or the like. The truncated V-shaped bearing races cooperating with the spherical balls provide a compact assembly which is free of play between the sleeve 50 and the support flange 58 both in the axial direction and in the radial direction.

As stated hereinbefore, the axial adjustment device 40 is used in conjunction with a tool support 10, which may also include a radial adjustment device 30, and the tool support and axial adjustment device jointly comprise the tool holder assembly. During use, the tool holder assembly is mounted upon the machine tool by inserting the mounting shank 17 through both the hollow sleeve 50 and the tubular shaft 42 and the end of the mounting shank 17 is inserted into a guide bore provided in the support body 34. The tubular shaft 42 is fastened to the support body 34 and the sleeve 50 is threaded onto the tubular shaft. The tool support 10 is attached to the axial adjustment device 40 by attaching the support flange 58 to the support member 12 and then the desired axial position of the work tool is adjusted by angularly displacing the sleeve 50 about the tubular shaft 42. When the desired axial position of the work tool has been obtained, the graduated ring 55 is manually rotated to set the zero indicia opposite a fixed datum mark provided on the support flange 58 and the locking rods 35 are locked into place. By such a construction, the machining forces imparted to the tool support 10 during the machining operation are not transmitted to the axial adjustment device 40 so that the preselected axial position of the work tool is maintained the machining operation.

When it is desired to adjust the axial position of the work tool 14, the locking rods 35 are loosened and the graduated ring 55 is manually turned about the sleeve 50 to move the desired indicia opposite the fixed datum. Then a tool is inserted into one of the blind bores 53 and the sleeve 50 is angularly displaced in the appropriate direction to either extend the sleeve or retract the sleeve relative to the tubular shaft 42. The sleeve 50 is turned until the zero indicia again aligns with the fixed datum thereby indicating that the sleeve 50 has been turned sufficiently to effect the desired degree of axial displacement of the work tool 14. The locking rods 35 are then tightened down and the mounting shank 17 is locked in the new position.

The invention has been described in conjunction with one preferred embodiment and obvious modifications and changes will be evident to those skilled in the art and the present invention is intended to cover all such modifications and changes falling within the spirit and scope of the invention as defined in the appended claims.

I claim:

1. A tool holder assembly for releaseably holding a work tool comprising: a tool support having means for releaseably holding a work tool and having a mounting shank axially slideably mountable on a machine tool during use of the tool holder assembly so that axial sliding movement of said mounting shank effects corresponding movement of the work tool; and adjusting means for selectively adjusting the axial position of said mounting shank to accordingly effect adjustment of the position of the work tool comprising a first tubular member movably disposed coaxially about said mounting shank and movable relative thereto and having means for releaseably fastening said first tubular member to the machine tool, a second tubular member movably disposed coaxially about said mounting shank and movable relative thereto, mounting means mounting said second tubular member for rotational movement relative to both said first tubular member and said tool support and mounting said second tubular member for axial movement integrally with said tool support, and means including a threaded coupling between said first and second tubular members for effecting axial displacement of said second tubular member relative to said first tubular member accompanied by corresponding movement of said tool support in response to angular displacement of said second tubular member; whereby the position of the work tool can be selectively adjusted in response to angular displacement of said second tubular member.

2. A tool holder assembly according to claim 1; wherein said mounting means comprises a support flange releaseably connected to said tool support and having an annular groove therein defining an annular outer bearing race, means defining an annular groove extending around the outer periphery of said second tubular member defining an inner bearing race, and a set of rollable members rollably disposed between said inner and outer bearing races.

3. A tool holder assembly according to claim 2; wherein each annular groove has a generally V-shaped cross-section.

4. A tool holder assembly according to claim 1; wherein said first tubular member comprises a tubular shaft having a threaded portion and said second tubular member comprises a hollow sleeve having a threaded portion in threaded engagement with said tubular shaft threaded portion and defining therewith said threaded coupling.

5. A tool holder assembly according to claim 4; wherein said tubular shaft threaded portion comprises an externally threaded portion of said tubular shaft, and said hollow sleeve threaded portion comprises an internally threaded portion of said hollow sleeve.

6. A tool holder assembly according to claim 5; wherein said mounting means comprises a support flange connected to said tool support and having an annular groove therein defining an annular outer bearing race, means defining an annular groove extending around the outer periphery of said second tubular member defining an inner bearing race, and a set of rollable members rollably disposed between said inner and outer bearing races.

7. A tool holder assembly according to claim 6; wherein each annular groove has a generally V-shaped cross-section.

8. A tool holder assembly according to claim 6; including a graduated ring disposed coaxially around said hollow sleeve, means mounting said ring in frictional engagement with said hollow sleeve to effect combined movement of said hollow sleeve and ring in response to angular turning of said hollow sleeve and permitting angular movement of said ring relative to and about said hollow sleeve in response to manual turning of said ring, and cooperating indicia on said support flange and ring for providing a visible indication of the extent of angular displacement of said hollow sleeve.

9. A tool holder assembly according to claim 6; including means defining a plurality of circumferentially spaced-apart blind holes in the outer surface of said hollow sleeve adapted to receive therein a tool for facilitating the angular displacement of said hollow sleeve.

* * * * *